United States Patent
Zhou et al.

(10) Patent No.: US 9,390,475 B2
(45) Date of Patent: Jul. 12, 2016

(54) BACKLIGHT DETECTION METHOD AND DEVICE

(71) Applicant: Huawei Device Co., Ltd., Shenzhen (CN)

(72) Inventors: Hua Zhou, Shenzhen (CN); Wei Luo, Shanghai (CN); Bin Deng, Shenzhen (CN); Cheng Du, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/566,020

(22) Filed: Dec. 10, 2014

(65) Prior Publication Data

US 2015/0093040 A1    Apr. 2, 2015

Related U.S. Application Data

(63) Continuation of application No. PCT/CN2013/090806, filed on Dec. 28, 2013.

(30) Foreign Application Priority Data

Jan. 7, 2013   (CN) .......................... 2013 1 0005069

(51) Int. Cl.
*G06K 9/40*   (2006.01)
*G06T 5/00*   (2006.01)
(Continued)

(52) U.S. Cl.
CPC ................. *G06T 5/00* (2013.01); *G06T 7/0002* (2013.01); *G06T 7/0081* (2013.01);
(Continued)

(58) Field of Classification Search
CPC ...... H04N 5/2351; G06T 5/00; G06T 7/0081; G06T 7/0002; G06T 2207/20148; G06T 2207/30168; G06T 2207/20144; G06T 2207/10024; G06T 2207/30201; G03B 2215/0503; G03B 7/28; G03B 7/08; G03B 15/05; G03B 19/02
USPC .......................................................... 382/274
See application file for complete search history.

(56) References Cited

U.S. PATENT DOCUMENTS 5,703,644 A    12/1997  Mori et al.
6,950,141 B2    9/2005  Mori et al.
(Continued)

FOREIGN PATENT DOCUMENTS

CN    101008762 A    8/2007
CN    102006422 A    4/2011
(Continued)

OTHER PUBLICATIONS

Foreign Communication From a Counterpart Application, European Application No. 13870104.0, Extended European Search Report dated Jul. 17, 2015, 10 pages.
Partial English Translation and Abstract of Chinese Patent Application No. CN102006422A, Part 1, Jan. 7, 2015, 4 pages.
Partial English Translation and Abstract of Chinese Patent Application No. CN102006422A, Part 2, Jan. 7, 2015, 2 pages.
(Continued)

*Primary Examiner* — Ali Bayat
(74) *Attorney, Agent, or Firm* — Conley Rose, P.C.; Grant Rodolph

(57) ABSTRACT

A backlight detection method and device, and the method includes acquiring a brightness value of each image block in a to-be-checked image, determining a brightness relationship between the adjacent image blocks according to the brightness value of each image block; and determining a dark region and a bright region in the to-be-checked image according to the brightness relationship between the adjacent image blocks, and determining whether the to-be-checked image is a backlight scenario according to the dark region and the bright region. The backlight detection method and device provided by the embodiments of the present invention can improve accuracy of backlight detection.

16 Claims, 3 Drawing Sheets

(51) Int. Cl.
*H04N 5/235* (2006.01)
*G06T 7/00* (2006.01)

(52) U.S. Cl.
CPC ... *H04N 5/2351* (2013.01); *G06T 2207/20144* (2013.01); *G06T 2207/20148* (2013.01); *G06T 2207/30168* (2013.01)

(56) References Cited

U.S. PATENT DOCUMENTS

| | | | |
|---|---|---|---|
| 7,010,160 B1 | 3/2006 | Yoshida | |
| 2002/0090213 A1* | 7/2002 | Ohtsuka | 396/234 |
| 2004/0101296 A1* | 5/2004 | Nakata et al. | 396/65 |
| 2007/0115372 A1 | 5/2007 | Wu et al. | |
| 2008/0007634 A1* | 1/2008 | Nonaka et al. | 348/234 |
| 2010/0053384 A1* | 3/2010 | Manabe | 348/254 |
| 2011/0050937 A1 | 3/2011 | Huang | |
| 2011/0221933 A1* | 9/2011 | Yuan et al. | 348/234 |

FOREIGN PATENT DOCUMENTS

| | | |
|---|---|---|
| EP | 1158353 A2 | 11/2011 |
| JP | 2000004393 A | 1/2000 |
| JP | 2007166028 A | 6/2007 |
| JP | 2010056853 A | 3/2010 |

OTHER PUBLICATIONS

Lee, J., et al., "An Advanced Video Camera System with Robust AF, AE, and AWB Control," IEEE Transactions on Consumer Electronics, vol. 47, No. 3, Aug. 2001, pp. 694-699.
Liang, J., et al., "An Auto-exposure Algorithm for Detecting High Contrast Lighting Conditions," Oct. 22-25, 2007, pp. 725-728.
Foreign Communication From a Counterpart Application, PCT Application No. PCT/CN2013/090806, English Translation of International Search Report dated Mar. 6, 2014, 2 pages.
Foreign Communication From a Counterpart Application, PCT Application No. PCT/CN2013/090806, Written Opinion dated Mar. 6, 2014, 6 pages.
Partial English Translation and Abstract of Japanese Patent Application No. JPA2000004393, May 5, 2016, 27 pages.
Partial English Translation and Abstract of Japanese Patent Application No. JPA2010056853, May 5, 2016, 29 pages.
Foreign Communication From A Counterpart Application, Japanese Application No. 2015-527788, Japanese Office Action dated Mar. 15, 2016, 4 pages.
Foreign Communication From A Counterpart Application, Japanese Application No. 2015-527788, English Translation of Japanese Office Action dated Mar. 15, 2016, 4 pages.

* cited by examiner

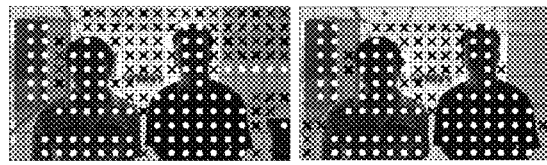
FIG. 3A  FIG. 3B
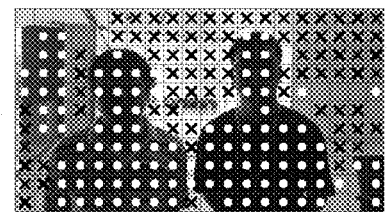
FIG. 4
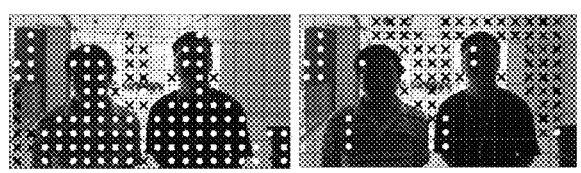
FIG. 3C  FIG. 3D
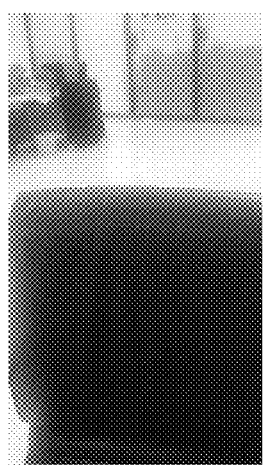  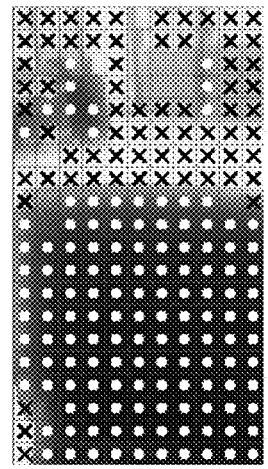
FIG. 5A  FIG. 5B

BACKLIGHT DETECTION METHOD AND DEVICE

CROSS-REFERENCE TO RELATED APPLICATIONS

This application is a continuation of International Application No. PCT/CN2013/090806, filed on Dec. 28, 2013, which claims priority to Chinese Patent Application No. 201310005069.9, filed on Jan. 7, 2013, both of which are hereby incorporated by reference in their entireties.

TECHNICAL FIELD

The present invention relates to the field of information technologies, and in particular, to a backlight detection method and device.

BACKGROUND

In an imaging process using an imaging device such as a digital camera or a video camera, backlight photographing often results in an excessively bright background but an excessively dark photographed object of real concern, namely, an object part. Backlight detection can be widely applied to functions, such as intelligent scenario recognition and automatic exposure control, of an imaging apparatus such as a digital camera or a video camera.

According to backlight detection in the prior art, an image is first divided into multiple rectangular blocks, consecutive rectangular blocks whose brightness value is less than a brightness threshold are searched for, and then the number of rectangular blocks that meet a condition is counted. If a total number of the rectangular blocks is greater than a preset threshold, and color saturation variance of the entire image is greater than a preset saturation threshold, it is determined that the image is a backlight scenario.

However, in the prior art, accuracy of backlight detection is low.

SUMMARY

Embodiments of the present invention provide a backlight detection method and device to improve accuracy of backlight detection.

According to a first aspect, an embodiment of the present invention provides a backlight detection method, which includes acquiring a brightness value of each image block in a to-be-checked image; determining a brightness relationship between the adjacent image blocks according to the brightness value of each image block; and determining a dark region and a bright region in the to-be-checked image according to the brightness relationship between the adjacent image blocks, and determining whether the to-be-checked image is a backlight scenario according to the dark region and the bright region.

With reference to the first aspect, in a first possible implementation manner, the to-be-checked image includes M rows and N columns of image blocks, and both M and N are positive integers; and the determining a brightness relationship between the adjacent image blocks according to the brightness value of each image block includes determining a brightness relationship between any two adjacent image blocks in each row of the to-be-checked image according to a magnitude relationship between a brightness value difference and a first preset brightness threshold, where the brightness value difference is a difference between the any two adjacent image blocks in each row of the to-be-checked image; and/or determining a brightness relationship between any two adjacent image blocks in each column of the to-be-checked image according to a magnitude relationship between a brightness value difference and a first preset brightness threshold, where the brightness value difference is a difference between the any two adjacent image blocks in each column of the to-be-checked image.

With reference to the first possible implementation manner of the first aspect, in a second possible implementation manner, the determining a brightness relationship between any two adjacent image blocks according to a magnitude relationship between a brightness value difference and a first preset brightness threshold, where the brightness value difference is a difference between the any two adjacent image blocks, includes, if the brightness value difference between the any two adjacent image blocks is greater than the first preset brightness threshold, determining that brightness of one image block of the any two adjacent image blocks is greater than brightness of the other image block; or if an absolute value of the brightness value difference between the any two adjacent image blocks is less than or equal to the first preset brightness threshold, determining that the any two adjacent image blocks have the same brightness.

With reference to the first or the second possible implementation manner of the first aspect, in a third possible implementation manner, the first preset brightness threshold is an average value of all absolute values of the brightness value differences between the any two adjacent image blocks in the to-be-checked image.

With reference to any one of the first to the third possible implementation manners of the first aspect, in a fourth possible implementation manner, the determining a dark region and a bright region in the to-be-checked image according to the brightness relationship between the adjacent image blocks includes, if the brightness of one image block of the any two adjacent image blocks is less than the brightness of the other image block and a brightness value of the image block with a smaller brightness value is less than a second preset brightness threshold, determining that the image block with the smaller brightness value is the dark region; if the brightness of one image block of the any two adjacent image blocks is less than the brightness of the other image block and the brightness value of the image block with the smaller brightness value is greater than or equal to the second preset brightness threshold, determining that the image block with the smaller brightness value is a bright-dark transition region; if the brightness of one image block of the any two adjacent image blocks is greater than the brightness of the other image block and a brightness value of the image block with a larger brightness value is greater than a third preset brightness threshold, determining that the image block with the larger brightness value is the bright region; and if the brightness of one image block of the any two adjacent image blocks is greater than the brightness of the other image block and the brightness value of the image block with the larger brightness value is less than or equal to the third preset brightness value, determining that the image block with the larger brightness value is the bright-dark transition region.

With reference to any one of the first to the fourth possible implementation manners of the first aspect, in a fifth possible implementation manner, before the determining a brightness relationship between any two adjacent image blocks in each row of the to-be-checked image according to a magnitude relationship between a brightness value difference and a first preset brightness threshold, where the brightness value difference is a difference between the any two adjacent image blocks in each row of the to-be-checked image, the method further includes acquiring the brightness value difference between the any two adjacent image blocks in each row in a sequence from a first image block to a last image block in each row of the to-be-checked image, or acquiring the brightness value difference between the any two adjacent image blocks in each row in a sequence from a last image block to a first image block in each row of the to-be-checked image; and before the determining a brightness relationship between any two adjacent image blocks in each column of the to-be-checked image according to a magnitude relationship between a brightness value difference and a first preset brightness threshold, where the brightness value difference is a difference between the any two adjacent image blocks in each column of the to-be-checked image, the method further includes acquiring the brightness value difference between the any two adjacent image blocks in each column in a sequence from a first image block to a last image block in each column of the to-be-checked image, or acquiring the brightness value difference between the any two adjacent image blocks in each column in a sequence from a last image block to a first image block in each column of the to-be-checked image.

With reference to the fifth possible implementation manner of the first aspect, in a sixth possible implementation manner, the determining a dark region and a bright region in the to-be-checked image according to the brightness relationship between the adjacent image blocks further includes determining, for any image block in each row or each column, the image block as the bright region or the dark region if it is determined that the image block is the bright region or the dark region in both the sequence from the first image block to the last image block in each row or each column and the sequence from the last image block to the first image block in each row or each column; or determining, for any image block in each row or each column, the image block as the bright-dark transition region if it is determined that the image block is the bright region in one sequence and is the dark region in another sequence, where the one sequence and the another sequence are the sequence from the first image block to the last image block in each row or each column and the sequence from the last image block to the first image block in each row or each column; or determining, for any image block in each row or each column, the image block as the dark region or the bright region if it is determined that the image block is the dark region or the bright region in one sequence and is the bright-dark transition region in another sequence, where the one sequence and the another sequence are the sequence from the first image block to the last image block in each row or each column and the sequence from the last image block to the first image block in each row or each column.

With reference to the sixth possible implementation manner of the first aspect, in a seventh possible implementation manner, the determining whether the to-be-checked image is a backlight scenario according to the dark region and the bright region includes, if the dark region and the bright region in the to-be-checked image meet a preset bright-dark relationship, determining that the to-be-checked image is the backlight scenario, where the preset bright-dark relationship meets any one condition of or a combination of multiple conditions of the following conditions a ratio of a total area of the dark region to an area of the to-be-checked image is greater than a preset ratio; an average value of brightness values of the dark regions is less than a preset average value; and a difference between an average value of brightness values of the bright regions and the average value of the brightness values of the dark regions is greater than a preset difference.

With reference to any one of the first to the seventh possible implementation manners of the first aspect, in an eighth possible implementation manner, after the determining whether the to-be-checked image is a backlight scenario according to the dark region and the bright region, the method further includes performing verification on the backlight scenario, where if an average gradient of a pixel included in the dark region in the to-be-checked image is greater than a preset gradient threshold, it is determined that the to-be-checked image is the backlight scenario; and if the average gradient of a pixel included in the dark region in the to-be-checked image is less than the preset gradient threshold, it is determined that the to-be-checked image is a non-backlight scenario.

According to a second aspect, an embodiment of the present invention provides a backlight detection device, which includes an acquiring module configured to acquire a brightness value of each image block in a to-be-checked image; a determining module configured to determine a brightness relationship between the adjacent image blocks according to the brightness value of each image block; and a processing module configured to determine a dark region and a bright region in the to-be-checked image according to the brightness relationship between the adjacent image blocks, and determine whether the to-be-checked image is a backlight scenario according to the dark region and the bright region.

With reference to the second aspect, in a first possible implementation manner, the to-be-checked image includes M rows and N columns of image blocks, and both M and N are positive integers; and the determining module is configured to determine a brightness relationship between any two adjacent image blocks in each row of the to-be-checked image according to a magnitude relationship between a brightness value difference and a first preset brightness threshold, where the brightness value difference is a difference between the any two adjacent image blocks in each row of the to-be-checked image; and/or determine a brightness relationship between any two adjacent image blocks in each column of the to-be-checked image according to a magnitude relationship between a brightness value difference and a first preset brightness threshold, where the brightness value difference is a difference between the any two adjacent image blocks in each column of the to-be-checked image.

With reference to the first possible implementation manner of the second aspect, in a second possible implementation manner, the determining module is configured to, if the brightness value difference between the any two adjacent image blocks is greater than the first preset brightness threshold, determine that brightness of one image block of the any two adjacent image blocks is greater than brightness of the other image block; or if an absolute value of the brightness value difference between the any two adjacent image blocks is less than or equal to the first preset brightness threshold, determine that the any two adjacent image blocks have the same brightness.

With reference to the first or the second possible implementation manner of the second aspect, in a third possible implementation manner, the first preset brightness threshold is an average value of all absolute values of the brightness value differences between the any two adjacent image blocks in the to-be-checked image.

With reference to any one of the first to the third possible implementation manners of the second aspect, in a fourth possible implementation manner, the processing module is configured to, if the brightness of one image block of the any two adjacent image blocks is less than the brightness of the other image block and a brightness value of the image block with a smaller brightness value is less than a second preset brightness threshold, determine that the image block with the smaller brightness value is the dark region; if the brightness of one image block of the any two adjacent image blocks is less than the brightness of the other image block and the brightness value of the image block with the smaller brightness value is greater than or equal to the second preset brightness threshold, determine that the image block with the smaller brightness value is a bright-dark transition region; if the brightness of one image block of the any two adjacent image blocks is greater than the brightness of the other image block and a brightness value of the image block with a larger brightness value is greater than a third preset brightness threshold, determine that the image block with the larger brightness value is the bright region; and if the brightness of one image block of the any two adjacent image blocks is greater than the brightness of the other image block and the brightness value of the image block with the larger brightness value is less than or equal to the third preset brightness value, determine that the image block with the larger brightness value is the bright-dark transition region.

With reference to any one of the first to the fourth possible implementation manners of the second aspect, in a fifth possible implementation manner, the determining module is further configured to acquire the brightness value difference between the any two adjacent image blocks in each row in a sequence from a first image block to a last image block in each row of the to-be-checked image, or acquire the brightness value difference between the any two adjacent image blocks in each row in a sequence from a last image block to a first image block in each row of the to-be-checked image; and acquire the brightness value difference between the any two adjacent image blocks in each column in a sequence from a first image block to a last image block in each column of the to-be-checked image, or acquire the brightness value difference between the any two adjacent image blocks in each column in a sequence from a last image block to a first image block in each column of the to-be-checked image.

With reference to the fifth possible implementation manner of the second aspect, in a sixth possible implementation manner, the processing module is further configured to determine, for any image block in each row or each column, the image block as the bright region or the dark region if it is determined that the image block is the bright region or the dark region in both the sequence from the first image block to the last image block in each row or each column and the sequence from the last image block to the first image block in each row or each column; or determine, for any image block in each row or each column, the image block as the bright-dark transition region if it is determined that the image block is the bright region in one sequence and is the dark region in another sequence, where the one sequence and the another sequence are the sequence from the first image block to the last image block in each row or each column and the sequence from the last image block to the first image block in each row or each column; or determine, for any image block in each row or each column, the image block as the dark region or the bright region if it is determined that the image block is the dark region or the bright region in one sequence and is the bright-dark transition region in another sequence, where the one sequence and the another sequence are the sequence from the first image block to the last image block in each row or each column and the sequence from the last image block to the first image block in each row or each column.

With reference to the sixth possible implementation manner of the second aspect, in a seventh possible implementation manner, the processing module is configured to, if the dark region and the bright region in the to-be-checked image meet a preset bright-dark relationship, determine that the to-be-checked image is the backlight scenario, where the preset bright-dark relationship meets any one condition of or a combination of multiple conditions of the following conditions: a ratio of a total area of the dark region to an area of the to-be-checked image is greater than a preset ratio; an average value of brightness values of the dark regions is less than a preset average value; and a difference between an average value of brightness values of the bright regions and the average value of the brightness values of the dark regions is greater than a preset difference.

With reference to any one of the first to the seventh possible implementation manners of the second aspect, in an eighth possible implementation manner, the processing module is further configured to perform verification on the backlight scenario, where if an average gradient of a pixel included in the dark region in the to-be-checked image is greater than a preset gradient threshold, it is determined that the to-be-checked image is the backlight scenario; and if the average gradient of a pixel included in the dark region in the to-be-checked image is less than the preset gradient threshold, it is determined that the to-be-checked image is a non-backlight scenario.

According to a third aspect, an embodiment of the present invention provides a backlight detection device, and the device includes a processor and a memory, where the memory stores an execution instruction; and when the backlight detection device runs, the processor communicates with the memory, and the processor executes the execution instruction so that the backlight detection device executes the method according to the first aspect and any one of the first to the eighth possible implementation manners of the first aspect.

According to a backlight detection method and device provided by the embodiments of the present invention, in this method, a brightness value of each image block in a to-be-checked image is acquired; a brightness relationship between the adjacent image blocks is determined according to the brightness value of each image block; and a dark region and a bright region in the to-be-checked image are determined according to the brightness relationship between the adjacent image blocks, and it is determined, according to the dark region and the bright region, whether the to-be-checked image is a backlight scenario, so that accuracy of backlight scenario detection is improved.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

FIG. 3A is Schematic Diagram 1 of a bright region and a dark region along a row direction in Embodiment 2 of a backlight detection method according to the present invention;

FIG. 3B is Schematic Diagram 2 of a bright region and a dark region along a row direction in Embodiment 2 of a backlight detection method according to the present invention;

FIG. 3C is Schematic Diagram 1 of a bright region and a dark region along a column direction in Embodiment 2 of a backlight detection method according to the present invention;

FIG. 3D is Schematic Diagram 2 of a bright region and a dark region along a column direction in Embodiment 2 of a backlight detection method according to the present invention;

FIG. 4 is Schematic Diagram 1 of a bright region and a dark region in Embodiment 2 of a backlight detection method according to the present invention;

FIG. 5A is Schematic Diagram 1 of a non-backlight scenario in Embodiment 2 of a backlight detection method according to the present invention;

FIG. 5B is Schematic Diagram 2 of a non-backlight scenario in Embodiment 2 of a backlight detection method according to the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by persons of ordinary skill in the art based on the embodiments of the present invention without creative efforts shall fall within the protection scope of the present invention.

Figure 1:
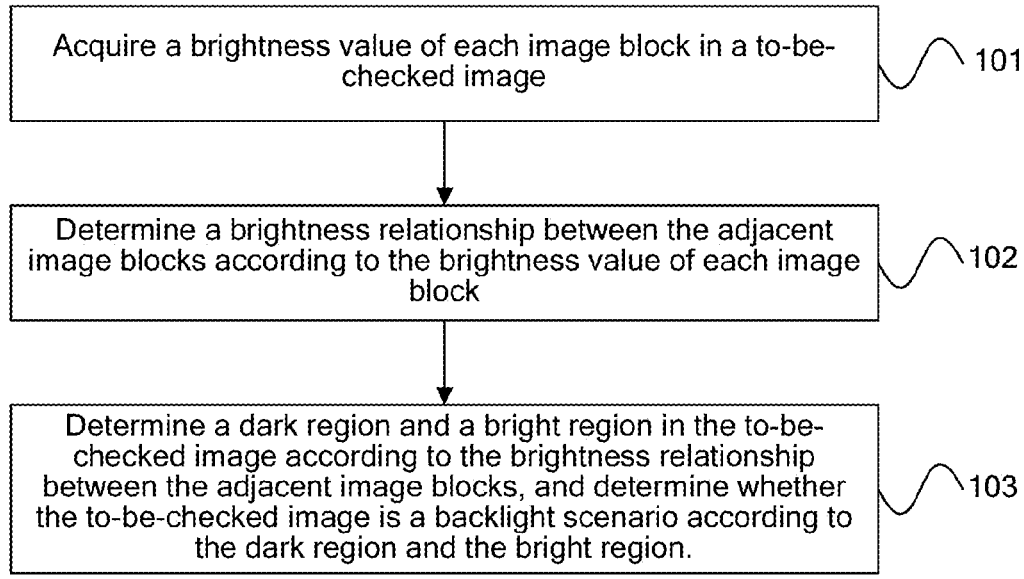
FIG. 1 is a flowchart of Embodiment 1 of a backlight detection method according to the present invention.

FIG. 1 is a flowchart of Embodiment 1 of a backlight detection method according to the present invention. This embodiment provides a backlight detection method, where the method may be executed by any device that executes the backlight detection method, and the device may be implemented by software and/or hardware. The device may be a terminal device, such as a mobile phone, a video camera, or a camera that has an imaging function, and this embodiment does not impose a limitation herein. As shown in FIG. 1, the method in this embodiment may include the following steps:

Step 101: Acquire a brightness value of each image block in a to-be-checked image.

In a specific implementation process, the to-be-checked image generally may be evenly divided into M×N image blocks, and various existing methods for calculating brightness of an image block may be used to calculate the brightness of each image block, where both M and N are positive integers, and a brightness value may be selected within a specific value range. For example, a value range is 0 to 255, and an intermediate brightness value is 128. Lij represents an image block corresponding to an $i^{th}$ row and a $j^{th}$ column, and a value of the Lij represents a brightness value of the image block Lij, where $1 \leq i \leq M$, and $1 \leq j \leq N$.

Step 102: Determine a brightness relationship between the adjacent image blocks according to the brightness value of each image block.

In an actual application process, the to-be-checked image includes M rows and N columns, and therefore, the determining a brightness relationship between the adjacent image blocks according to the brightness value of each image block may include two possible implementation manners:

In one possible implementation manner, the brightness relationship between the adjacent image blocks is determined according to a row of the to-be-checked image. A brightness relationship between any two adjacent image blocks in each row of the to-be-checked image is determined according to a magnitude relationship between a brightness value difference and a first preset brightness threshold, where the brightness value difference is a difference between the any two adjacent image blocks in each row of the to-be-checked image.

In the other possible implementation manner, the brightness relationship between the adjacent image blocks is determined according to a column of the to-be-checked image. A brightness relationship between any two adjacent image blocks in each column of the to-be-checked image is determined according to a magnitude relationship between a brightness value difference and a first preset brightness threshold, where the brightness value difference is a difference between the any two adjacent image blocks in each column of the to-be-checked image.

A person skilled in the art may understand that, in the foregoing two possible implementation manners, the brightness relationship between the adjacent image blocks may be determined only according to a row of the to-be-checked image or may be determined only according to a column of the to-be-checked image. That is, the brightness relationship between the adjacent image blocks is determined in a row or column manner, and may also be determined according to both a row and a column. The first preset brightness threshold may be determined according to experience, and may also be determined according to an average value of brightness value differences between adjacent image blocks. This embodiment does not impose a special limitation on a specific value of the first preset brightness threshold herein.

According to the backlight detection method provided by this embodiment, the brightness relationship between any two adjacent image blocks is determined according a row and/or a column of the to-be-checked image. In this way, the brightness relationship between the adjacent image blocks in the to-be-checked image can be determined from multiple angles, which achieves high accuracy of backlight detection.

Specially, the brightness relationship between the adjacent image blocks includes three cases. The $i^{th}$ row is used as an example, and the adjacent image blocks Lij and Lij+1 are used as an example. The three cases are as follows: brightness of the image block Lij+1 is less than brightness of the image block Lij, or brightness of the image block Lij+1 is greater than brightness of the image block Lij, or brightness of the image block Lij+1 is equal to brightness of the image block Lij. It should be noted that a specific position relationship between the image block Lij and the image block Lij+1 in a row in which the image block Lij and the image block Lij+1 are located is not limited herein. The image block Lij may be closer to a first image block in the row in which the image block Lij and the image block Lij+1 are located or may be the first image block in the row in which the image block Lij and the image block Lij+1 are located, and the image block Lij+1 may be closer to the first image block in the row in which the image block Lij and the image block Lij+1 are located or may be the first image block in the row in which the image block Lij and the image block Lij+1 are located.

Step 103: Determine a dark region and a bright region in the to-be-checked image according to the brightness relationship between the adjacent image blocks, and determine whether the to-be-checked image is a backlight scenario according to the dark region and the bright region.

In an actual application process, the dark region and the bright region in the to-be-checked image may be determined according to the brightness relationship between the adjacent image blocks. In a specific implementation process, if the brightness of the image block Lij+1 is less than the brightness of the image block Lij and the brightness of the image block Lij+1 is less than a second preset brightness threshold, the image block Lij+1 is the dark region, and if the brightness of the image block Lij+1 is greater than the second preset brightness threshold, the image block Lij+1 is a bright-dark transition region; if the brightness of the image block Lij+1 is greater than the brightness of the image block Lij and the brightness of the image block Lij+1 is greater than a third preset brightness threshold, the image block Lij+1 is the bright region, and if the brightness of the image block Lij+1 is less than the third preset brightness threshold, the image block Lij+1 is the bright-dark transition region.

A person skilled in the art may understand that using the second preset brightness threshold may avoid determining an image block with a very large brightness value as the dark region; and using the third preset brightness threshold may avoid determining an image block with a very small brightness value as the bright region. The second preset brightness threshold and the third preset brightness threshold may be selected according to an empirical value, and a value range is relatively large and flexible. Generally, a value of the second preset brightness threshold is less than the intermediate brightness value and a value of the third preset brightness threshold is greater than the intermediate brightness value.

After the dark region and the bright region in the to-be-checked image are determined, it is determined whether the to-be-checked image is the backlight scenario according to the dark region and the bright region. If the dark region and the bright region in the to-be-checked image meet a preset bright-dark relationship, it is determined that the to-be-checked image is the backlight scenario. The preset bright-dark relationship meets any one condition or a combination of multiple conditions of the following conditions: a ratio of a total area of the dark region to an area of the to-be-checked image is greater than a preset ratio; an average value of brightness values of the dark regions is less than a preset average value; and a difference between an average value of brightness values of the bright regions and the average value of the brightness values of the dark regions is greater than a preset difference.

According to a backlight detection method provided by the embodiment of the present invention, a brightness value of each image block in a to-be-checked image is acquired; a brightness relationship between the adjacent image blocks is determined according to the brightness value of each image block; and a dark region and a bright region in the to-be-checked image are determined according to the brightness relationship between the adjacent image blocks, and it is determined whether the to-be-checked image is a backlight scenario according to the dark region and the bright region. This not only improves accuracy of backlight scenario detection when a backlight degree of a photographed subject significantly changes, but also improves accuracy of backlight scenario detection when a position, an area, a shape, and the like of the photographed subject significantly change.

The following describes the embodiment of the present invention in detail using a specific embodiment as an example.

Figure 2:
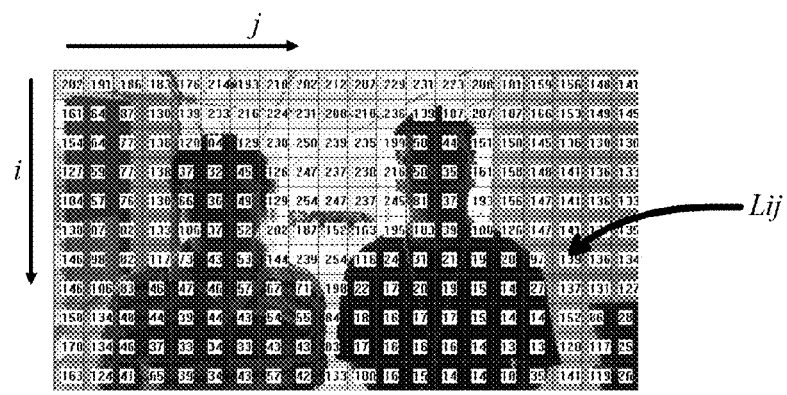
FIG. 2 is a schematic diagram of a brightness value of each image block in Embodiment 2 of a backlight detection method according to the present invention.

FIG. 2 is a schematic diagram of a brightness value of each image block in Embodiment 2 of a backlight detection method according to the present invention. As shown in FIG. 2, a to-be-checked image is first divided into 11 rows and 20 columns, and there are 11×20 image blocks in total; then a brightness value of each image block is determined. A person skilled in the art may understand that, for ease of description, the brightness value of each image block is indicated in each image block.

After the brightness value of each image block is obtained, a brightness value difference between any two adjacent image blocks is acquired. The brightness value difference between the any two adjacent image blocks may be acquired along a row direction, and may also be acquired along a column direction, which are described separately in the following.

Along the row direction, that is, in a sequence from a first image block to a last image block in each row of the to-be-checked image, a brightness value difference between any two adjacent image blocks in each row is acquired, that is, in a left-to-right sequence; and in a sequence from the last image block to the first image block in each row of the to-be-checked image, the brightness value difference between the any two adjacent image blocks in each row is acquired, that is, in a right-to-left sequence. The left-to-right sequence is used as an example in this embodiment. That is, along a j direction indicated by a horizontal arrow shown in FIG. 2, a brightness value difference between any two adjacent image blocks in an $i^{th}$ row is acquired, that is, a difference between Lij+1 and Lij is acquired. It should be noted that a specific position relationship between the image block Lij and the image block Lij+1 in a row in which the image block Lij and the image block Lij+1 are located is not limited herein. The image block Lij may be closer to a first image block in the row in which the image block Lij and the image block Lij+1 are located or may be the first image block in the row in which the image block Lij and the image block Lij+1 are located, and the image block Lij+1 may be closer to the first image block in the row in which the image block Lij and the image block Lij+1 are located or may be the first image block in the row in which the image block Lij and the image block Lij+1 are located.

Along the column direction, that is, in a sequence from a first image block to a last image block in each column of the to-be-checked image, a brightness value difference between any two adjacent image blocks in each column is acquired, that is, in a top-to-bottom sequence; and in a sequence from the last image block to the first image block in each column of the to-be-checked image, the brightness value difference between the any two adjacent image blocks in each column is acquired, in a bottom-to-top sequence. The top-to-bottom sequence is used as an example in this embodiment. That is, along an i direction indicated by a vertical arrow shown in FIG. 2, a brightness value difference between any two adjacent image blocks in a $j^{th}$ column is acquired, that is, a difference between Lij+1 and Lij is acquired.

Then, a brightness relationship between any two adjacent image blocks in each row of the to-be-checked image is determined according to a magnitude relationship between the brightness value difference and a first preset brightness threshold, where the brightness value difference is a difference between the any two adjacent image blocks in each row of the to-be-checked image, and a brightness relationship between any two adjacent image blocks in each column of the to-be-checked image is determined according to a magnitude relationship between a brightness value difference and the first preset brightness threshold, where the brightness value difference is a difference between the any two adjacent image blocks in each column of the to-be-checked image. The first preset brightness threshold is an average value of all absolute values of the brightness value differences between the any two adjacent image blocks in the to-be-checked image.

A person skilled in the art may understand that a manner of determining the brightness relationship between the any two adjacent image blocks according to a row is similar to that according to a column, and therefore, a row manner is used as an example in this embodiment. In addition, in the case of the row direction, a manner of determining the brightness relationship between the any two adjacent image blocks in the sequence from the first image block to the last image block in each row of the to-be-checked image is similar to that in the sequence from the last image block to the first image block in each row of the to-be-checked image, and therefore, the sequence from the first image block to the last image block in each row of the to-be-checked image is used as an example in the embodiment of the present invention to describe in detail the determining of the brightness relationship between the any two adjacent image blocks.

When the brightness relationship between the any two adjacent image blocks is determined in the sequence from the first image block to the last image block in each row of the to-be-checked image, the first preset brightness threshold $\Delta L$ is equal to $$\frac{1}{11 \times 20} \sum_{i=1,j=1}^{i=11,j=20} |L_{ij+1} - L_{ij}|.$$

According to the brightness value of each image block shown in FIG. 2, it may be obtained, by calculation, that the first preset brightness threshold $\Delta L$ is equal to 34. The brightness relationship between the image block $L_{ij+1}$ and the image block $L_{ij}$ is determined according to a magnitude relationship between a difference and $\Delta L$, where the difference is the difference between the image block $L_{ij+1}$ and the image block $L_{ij}$. A person skilled in the art may understand that, for a different to-be-checked image, a value of the first preset brightness threshold $\Delta L$ is different. When the brightness relationship between the any two adjacent image blocks is determined in the sequence from the first image block to the last image block in each column of the to-be-checked image, the value of the first preset brightness threshold $\Delta L$ needs to be recalculated.

If $L_{ij+1} - L_{ij} > \Delta L$, then $L_{ij} < L_{ij+1}$, that is, brightness of the image block $L_{ij+1}$ is greater than brightness of the image block $L_{ij}$; if $|L_{ij+1} - L_{ij}| \leq \Delta L$, then $L_{ij} = L_{ij+1}$, that is, the brightness of the image block $L_{ij+1}$ is equal to the brightness of the image block $L_{ij}$; if $L_{ij+1} - L_{ij} < \Delta L$, then $L_{ij} > L_{ij+1}$, that is, the brightness of the image block $L_{ij+1}$ is less than the brightness of the image block $L_{ij}$.

Then, a dark region and a bright region in the to-be-checked image are determined according to the brightness relationship between the adjacent image blocks. The row sequence is also used as an example herein. For the column sequence, which is similar to the row sequence, details are not described herein again in this embodiment.

In this embodiment, image blocks in a 4$^{th}$ row and the first 9 columns shown in FIG. 2 are used as an example. Table 1 shows corresponding values of the Lij and the Lij+1−Lij.

TABLE 1

| Lij | L41 | L42 | L43 | L44 | L45 | L46 | L47 | L48 | L49 |
|---|---|---|---|---|---|---|---|---|---|
| Lij | 127 | 59 | 77 | 138 | 37 | 32 | 45 | 126 | 247 |
| Lij + 1 − Lij | | −68 | 18 | 61 | −101 | −5 | 13 | 81 | 121 |
| Bright or dark region | | Dark | Dark | Bright | Dark | Dark | Dark | | Bright |

In this embodiment, a second preset brightness threshold Ldark, which can be used to avoid determining an image block with a very large brightness value as the dark region, may be set to 120; a third preset brightness threshold Llight, which can be used to avoid determining an image block with a very small brightness value as the bright region, may be set to 130. In this embodiment, after the dark region and the bright region in the to-be-checked image are determined, the dark region and the bright region can be marked. For a bright-dark transition region or an image block that cannot be determined as the bright region or the dark region, marking is not performed. In a process of marking the dark region and the bright region in the to-be-checked image, the dark region is marked as a white round dot and the bright region is marked as a black cross.

According to Table 1, it is learned that L42−L41=−68<−34 and L42 is less than the Ldark. This indicates that L42 is the dark region, and the image block L42 is marked. For the image block L41, because it is the first image block in the 4$^{th}$ row, no image block is available for comparison. As a result, it cannot be determined whether the image block L41 is bright or dark, and the image block L41 is not marked.

The following is a simple illustration of determining each image block as the dark region or the bright region. For specific marking, refer to FIG. 3A. FIG. 3A is Schematic Diagram 1 of a bright region and a dark region along a row direction in Embodiment 2 of a backlight detection method according to the present invention.

|L43−L42|=18<34, then brightness of the L43 is the same as that of the L42, and the L43 is the dark region; L44−L43=61>34 and the L44 is greater than the Llight, then the L44 is the bright region; L45−L44=−101<−34 and the L45 is less than the Ldark, then the L45 is the dark region; |L46−L45|=5<34, then brightness of the L46 is the same as that of the L45, and the L46 is the dark region; |L47−L46|=13<34, then brightness of the L47 is the same as that of the L46, and the L47 is the dark region; L48−L47=81>34, but the L48 is less than the Llight, then the L48 is the bright-dark transition region; and L49−L48=121>34 and the L49 is greater than the Llight, then the L49 is the bright region.

FIG. 3B is Schematic Diagram 2 of a bright region and a dark region along a row direction in Embodiment 2 of a backlight detection method according to the present invention. The row direction in FIG. 3B is opposite to the row direction in FIG. 3A. FIG. 3C is Schematic Diagram 1 of a bright region and a dark region along a column direction in Embodiment 2 of a backlight detection method according to the present invention, that is, in a top-to-bottom sequence along a column. FIG. 3D is Schematic Diagram 2 of a bright region and a dark region along a column direction in Embodiment 2 of a backlight detection method according to the present invention, that is, in a bottom-to-top sequence along a column. A method for acquiring FIG. 3B to FIG. 3D is similar to that for acquiring FIG. 3A, and details are not described herein again in this embodiment.

After FIG. 3A to FIG. 3D are obtained, FIG. 3A to FIG. 3D are merged to form FIG. 4, and a final dark region and a final bright region in the to-be-checked image are obtained. FIG. 4 is Schematic Diagram 1 of a bright region and a dark region in Embodiment 2 of a backlight detection method according to the present invention. In a specific implementation process, firstly, the dark region and the bright region in the to-be-checked image along the row direction are determined according to FIG. 3A and FIG. 3B, and the dark region and the bright region in the to-be-checked image along the column direction are determined according to FIG. 3C and FIG. 3D. Then, the final dark region and the final bright region in a to-be-checked image are determined according to a determining result of FIG. 3A and FIG. 3B and a determining result of FIG. 3C and FIG. 3D. Preferably, a determining principle for determining the dark region and the bright region in the to-be-checked image according to FIG. 3A and FIG. 3B, or FIG. 3C and FIG. 3D, or the determining result of FIG. 3A and FIG. 3B and the determining result of FIG. 3C and FIG. 3D is as follows: determining, for any image block in each row or each column, the image block as the bright region or the dark region if it is determined that the image block is the bright region or the dark region in both the sequence from the first image block to the last image block in each row or each column and the sequence from the last image block to the first image block in each row or each column; or determining, for any image block in each row or each column, the image block as the bright-dark transition region if it is determined that the image block is the bright region in one sequence and is the dark region in another sequence, where the one sequence and the another sequence are the sequence from the first image block to the last image block in each row or each column and the sequence from the last image block to the first image block in each row or each column; or determining, for any image block in each row or each column, the image block as the dark region or the bright region if it is determined that the image block is the dark region or the bright region in one sequence and is the bright-dark transition region in another sequence, where the one sequence and the another sequence are the sequence from the first image block to the last image block in each row or each column and the sequence from the last image block to the first image block in each row or each column.

By determining the bright region and the dark region in the to-be-checked image according to the foregoing principle, a bright-dark relationship of all image blocks can be comprehensively considered, and the bright region and the dark of the to-be-checked image can be corrected to improve accuracy of backlight detection.

FIG. 4 obtained according to the foregoing method shows the final dark region and the final bright region in the to-be-checked image in the embodiment of the present invention. It may be determined whether the to-be-checked is a backlight scenario according to the dark region and the bright region shown in FIG. 4. When the dark region and the bright region in the to-be-checked image meet a preset bright-dark relationship, it is determined that the to-be-checked image is the backlight scenario. The preset bright-dark relationship meets any one condition or a combination of multiple conditions of the following conditions: a ratio of a total area of the dark region to an area of the to-be-checked image is greater than a preset ratio; an average value of brightness values of the dark regions is less than a preset average value; and a difference between an average value of brightness values of the bright regions and the average value of the brightness values of the dark regions is greater than a preset difference.

After it is determined that the to-be-checked image is the backlight scenario, verification is performed on the to-be-checked image to exclude a case in which a black object is mistakenly regarded as the backlight scenario. In a specific implementation process, if an average gradient of a pixel included in the dark region in the to-be-checked image is greater than a preset gradient threshold, it is determined that the to-be-checked image is the backlight scenario; if the average gradient of a pixel included in the dark region in the to-be-checked image is less than the preset gradient threshold, it is determined that a photographed subject is a black object and the to-be-checked image is a non-backlight scenario. A specific value of the preset gradient threshold may be set according to experience. In this embodiment, the preset gradient threshold is 4, and the average gradient of a pixel included in the dark region in FIG. 4 of this embodiment is 6.13 and is greater than the preset gradient threshold. This indicates that the photographed subject in the to-be-checked image has rich texture and is not a black object, and the to-be-checked image is the backlight scenario.

FIG. 5A is Schematic Diagram 1 of a non-backlight scenario in Embodiment 2 of a backlight detection method according to the present invention, and FIG. 5B is Schematic Diagram 2 of a non-backlight scenario in Embodiment 2 of a backlight detection method according to the present invention. As shown in FIG. 5A, a photographed subject in a to-be-checked image is a black object, and FIG. 5B shows a bright region and a dark region in the to-be-checked image. An average gradient of a pixel included in the dark region in FIG. 5B is calculated, which is 0.988 and is less than the preset gradient threshold. This indicates that the photographed subject in the to-be-checked image does not have rich texture and is a black object. A conclusion obtained according to FIG. 5B is consistent with that shown in FIG. 5A.

In the embodiment of the present invention, verification is performed on a backlight scenario. An average gradient of a pixel included in a dark region is calculated, so that a case in which a scenario with a massive black object is mistakenly identified as a backlight scenario can be excluded, and accuracy of backlight detection is improved.

In conclusion, according to a backlight detection method provided by the embodiment of the present invention, a dark region and a bright region in a to-be-checked image are determined according to a brightness relationship between adjacent image blocks, which can improve accuracy of backlight scenario detection, without a need to set a precise brightness threshold for determining the dark region, when a backlight degree of a photographed subject significantly changes; it is determined whether the to-be-checked image is a backlight scenario according to the dark region and the bright region, which can improve accuracy of backlight scenario detection when a position, an area, a shape, and the like of the photographed subject significantly change; and the backlight scenario is verified, which can exclude a case in which a scenario with a massive black object is mistakenly identified as the backlight scenario, and can improve accuracy of backlight detection.

Figure 6:
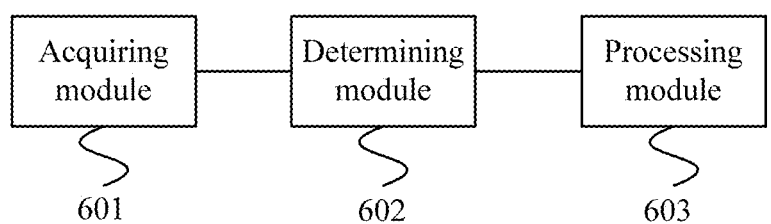
FIG. 6 is a schematic structural diagram of Embodiment 1 of a backlight detection device according to the present invention.

FIG. 6 is a schematic structural diagram of Embodiment 1 of a backlight detection device according to the present invention. The backlight detection device provided by this embodiment may be a terminal device, such as a mobile phone, a camera, a video camera, or a computer that includes an imaging lens. A to-be-checked image may be acquired using the lens, and it is detected whether the to-be-checked image is a backlight scenario using modules of the backlight detection device that is shown in FIG. 6 and provided by the embodiment of the present invention. As shown in FIG. 6, the backlight detection device provided by the embodiment of the present invention includes an acquiring module 601, a determining module 602, and a processing module 603.

The acquiring module 601 is configured to acquire a brightness value of each image block in a to-be-checked image.

The determining module 602 is configured to determine a brightness relationship between the adjacent image blocks according to the brightness value of each image block.

The processing module 603 is configured to determine a dark region and a bright region in the to-be-checked image according to the brightness relationship between the adjacent image blocks, and determine whether the to-be-checked image is a backlight scenario according to the dark region and the bright region.

The backlight detection device according to this embodiment may be used to execute the technical solutions of the method embodiment shown in FIG. 1, and implementation principles and technical effects of the backlight detection device are similar to those of the method embodiment shown in FIG. 1, which are not described herein again.

Further, the to-be-checked image includes M rows and N columns of image blocks, and both M and N are positive integers; and the determining module 602 is configured to determine a brightness relationship between any two adjacent image blocks in each row of the to-be-checked image according to a magnitude relationship between a brightness value difference and a first preset brightness threshold, where the brightness value difference is a difference between the any two adjacent image blocks in each row of the to-be-checked image; and/or determine a brightness relationship between any two adjacent image blocks in each column of the to-be-checked image according to a magnitude relationship between a brightness value difference and a first preset brightness threshold, where the brightness value difference is a difference between the any two adjacent image blocks in each column of the to-be-checked image.

Further, the determining module 602 is configured to, if the brightness value difference between the any two adjacent image blocks is greater than the first preset brightness threshold, determine that brightness of one image block of the any two adjacent image blocks is greater than brightness of the other image block; or if an absolute value of the brightness value difference between the any two adjacent image blocks is less than or equal to the first preset brightness threshold, determine that the any two adjacent image blocks have the same brightness.

Further, the first preset brightness threshold is an average value of all absolute values of the brightness value differences between the any two adjacent image blocks in the to-be-checked image.

Further, the processing module 603 is configured to, if the brightness of one image block of the any two adjacent image blocks is less than the brightness of the other image block and a brightness value of the image block with a smaller brightness value is less than a second preset brightness threshold, determine that the image block with the smaller brightness value is the dark region; if the brightness of one image block of the any two adjacent image blocks is less than the brightness of the other image block and the brightness value of the image block with the smaller brightness value is greater than or equal to the second preset brightness threshold, determine that the image block with the smaller brightness value is a bright-dark transition region; if the brightness of one image block of the any two adjacent image blocks is greater than the brightness of the other image block and a brightness value of the image block with a larger brightness value is greater than a third preset brightness threshold, determine that the image block with the larger brightness value is the bright region; and if the brightness of one image block of the any two adjacent image blocks is greater than the brightness of the other image block and the brightness value of the image block with the larger brightness value is less than or equal to the third preset brightness value, determine that the image block with the larger brightness value is the bright-dark transition region.

Further, the determining module 602 is further configured to acquire the brightness value difference between the any two adjacent image blocks in each row in a sequence from a first image block to a last image block in each row of the to-be-checked image, or acquire the brightness value difference between the any two adjacent image blocks in each row in a sequence from a last image block to a first image block in each row of the to-be-checked image; and acquire the brightness value difference between the any two adjacent image blocks in each column in a sequence from a first image block to a last image block in each column of the to-be-checked image, or acquire the brightness value difference between the any two adjacent image blocks in each column in a sequence from a last image block to a first image block in each column of the to-be-checked image.

Further, the processing module 603 is further configured to determine, for any image block in each row or each column, the image block as the bright region or the dark region if it is determined that the image block is the bright region or the dark region in both the sequence from the first image block to the last image block in each row or each column and the sequence from the last image block to the first image block in each row or each column; or determine, for any image block in each row or each column, the image block as the bright-dark transition region if it is determined that the image block is the bright region in one sequence and is the dark region in another sequence, where the one sequence and the another sequence are the sequence from the first image block to the last image block in each row or each column and the sequence from the last image block to the first image block in each row or each column; or determine, for any image block in each row or each column, the image block as the dark region or the bright region if it is determined that the image block is the dark region or the bright region in one sequence and is the bright-dark transition region in another sequence, where the one sequence and the another sequence are the sequence from the first image block to the last image block in each row or each column and the sequence from the last image block to the first image block in each row or each column.

Further, the processing module 603 is configured to, if the dark region and the bright region in the to-be-checked image meet a preset bright-dark relationship, determine that the to-be-checked image is the backlight scenario, where the preset bright-dark relationship meets any one condition or a combination of multiple conditions of the following conditions a ratio of a total area of the dark region to an area of the to-be-checked image is greater than a preset ratio; an average value of brightness values of the dark regions is less than a preset average value; and a difference between an average value of brightness values of the bright regions and the average value of the brightness values of the dark regions is greater than a preset difference.

Further, the processing module 603 is further configured to perform verification on the backlight scenario, where if an average gradient of a pixel included in the dark region in the to-be-checked image is greater than a preset gradient threshold, it is determined that the to-be-checked image is the backlight scenario; and if the average gradient of a pixel included in the dark region in the to-be-checked image is less than the preset gradient threshold, it is determined that the to-be-checked image is a non-backlight scenario.

The backlight detection device according to this embodiment may be used to execute the technical solutions of the method embodiment shown in FIG. 2, and implementation principles and technical effects of the backlight detection device are similar to those of the method embodiment shown in FIG. 2, which are not described herein again.

Figure 7:
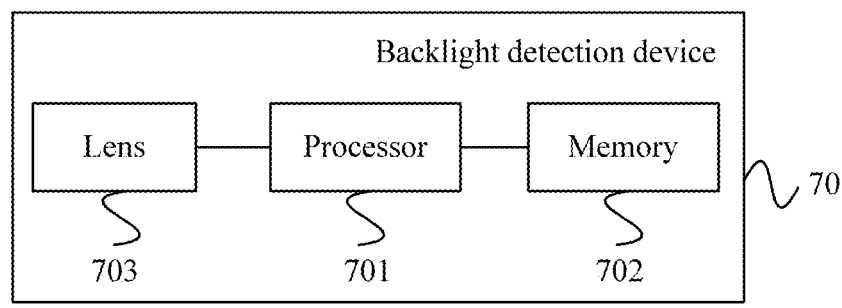
FIG. 7 is a schematic structural diagram of Embodiment 2 of a backlight detection device according to the present invention.

FIG. 7 is a schematic structural diagram of Embodiment 2 of a backlight detection device according to the present invention. The backlight detection device provided by this embodiment may be a terminal device, such as a mobile phone, a camera, a video camera, or a computer that includes an imaging lens. A to-be-checked image may be acquired using the lens, and it is detected whether the to-be-checked image is a backlight scenario using parts of the backlight detection device that is shown in FIG. 7 and provided by the embodiment of the present invention. As shown in FIG. 7, a backlight detection device 70 provided by this embodiment includes a processor 701 and a memory 702. The backlight detection device 70 further includes a lens 703, and the lens 703 may be connected to the processor 701. The processor 701 may acquire a to-be-checked image using the lens 703, divide the to-be-checked image into image blocks, and obtain a brightness value of each image block by calculation. The memory 702 stores an execution instruction; and when the backlight detection device 70 runs, the processor 701 communicates with the memory 702, and the processor 701 invokes the execution instruction in the memory 702 to perform the following operations: acquire a brightness value of each image block in a to-be-checked image; determine a brightness relationship between the adjacent image blocks according to the brightness value of each image block; and determine a dark region and a bright region in the to-be-checked image according to the brightness relationship between the adjacent image blocks, and determine whether the to-be-checked image is a backlight scenario according to the dark region and the bright region.

Further, the to-be-checked image includes M rows and N columns of image blocks, and both M and N are positive integers; and the determining a brightness relationship between the adjacent image blocks according to the brightness value of each image block includes determining a brightness relationship between any two adjacent image blocks in each row of the to-be-checked image according to a magnitude relationship between a brightness value difference and a first preset brightness threshold, where the brightness value difference is a difference between the any two adjacent image blocks in each row of the to-be-checked image; and/or determining a brightness relationship between any two adjacent image blocks in each column of the to-be-checked image according to a magnitude relationship between a brightness value difference and a first preset brightness threshold, where the brightness value difference is a difference between the any two adjacent image blocks in each column of the to-be-checked image.

Further, the determining a brightness relationship between any two adjacent image blocks according to a magnitude relationship between a brightness value difference and a first preset brightness threshold, where the brightness value difference is a difference between the any two adjacent image blocks, includes, if the brightness value difference between the any two adjacent image blocks is greater than the first preset brightness threshold, determining that brightness of one image block of the any two adjacent image blocks is greater than brightness of the other image block; or if an absolute value of the brightness value difference between the any two adjacent image blocks is less than or equal to the first preset brightness threshold, determining that the any two adjacent image blocks have the same brightness.

Further, the first preset brightness threshold is an average value of all absolute values of the brightness value differences between the any two adjacent image blocks in the to-be-checked image.

Further, the determining a dark region and a bright region in the to-be-checked image according to the brightness relationship between the adjacent image blocks includes, if the brightness of one image block of the any two adjacent image blocks is less than the brightness of the other image block and a brightness value of the image block with a smaller brightness value is less than a second preset brightness threshold, determining that the image block with the smaller brightness value is the dark region; if the brightness of one image block of the any two adjacent image blocks is less than the brightness of the other image block and the brightness value of the image block with the smaller brightness value is greater than or equal to the second preset brightness threshold, determining that the image block with the smaller brightness value is a bright-dark transition region; if the brightness of one image block of the any two adjacent image blocks is greater than the brightness of the other image block and a brightness value of the image block with a larger brightness value is greater than a third preset brightness threshold, determining that the image block with the larger brightness value is the bright region; and if the brightness of one image block of the any two adjacent image blocks is greater than the brightness of the other image block and the brightness value of the image block with the larger brightness value is less than or equal to the third preset brightness value, determining that the image block with the larger brightness value is the bright-dark transition region.

Further, before the determining a brightness relationship between any two adjacent image blocks in each row of the to-be-checked image according to a magnitude relationship between a brightness value difference and a first preset brightness threshold, where the brightness value difference is a difference between the any two adjacent image blocks in each row of the to-be-checked image, the operations further include acquiring the brightness value difference between the any two adjacent image blocks in each row in a sequence from a first image block to a last image block in each row of the to-be-checked image, or acquiring the brightness value difference between the any two adjacent image blocks in each row in a sequence from a last image block to a first image block in each row of the to-be-checked image; and before the determining a brightness relationship between any two adjacent image blocks in each column of the to-be-checked image according to a magnitude relationship between a brightness value difference and a first preset brightness threshold, where the brightness value difference is a difference between the any two adjacent image blocks in each column of the to-be-checked image, the operations further include acquiring the brightness value difference between the any two adjacent image blocks in each column in a sequence from a first image block to a last image block in each column of the to-be-checked image, or acquiring the brightness value difference between the any two adjacent image blocks in each column in a sequence from a last image block to a first image block in each column of the to-be-checked image.

Further, the determining a dark region and a bright region in the to-be-checked image according to the brightness relationship between the adjacent image blocks further includes determining, for any image block in each row or each column, the image block as the bright region or the dark region if it is determined that the image block is the bright region or the dark region in both the sequence from the first image block to the last image block in each row or each column and the sequence from the last image block to the first image block in each row or each column; or determining, for any image block in each row or each column, the image block as the bright-dark transition region if it is determined that the image block is the bright region in one sequence and is the dark region in another sequence, where the one sequence and the another sequence are the sequence from the first image block to the last image block in each row or each column and the sequence from the last image block to the first image block in each row or each column; or determining, for any image block in each row or each column, the image block as the dark region or the bright region if it is determined that the image block is the dark region or the bright region in one sequence and is the bright-dark transition region in another sequence, where the one sequence and the another sequence are the sequence from the first image block to the last image block in each row or each column and the sequence from the last image block to the first image block in each row or each column.

Further, the determining whether the to-be-checked image is a backlight scenario according to the dark region and the bright region includes, if the dark region and the bright region in the to-be-checked image meet a preset bright-dark relationship, determine that the to-be-checked image is the backlight scenario, where the preset bright-dark relationship meets any one condition of or a combination of multiple conditions of the following conditions: a ration of a total area of the dark region to an area of the to-be-checked image is greater than a preset ratio; an average value of brightness values of the dark regions is less than a preset average value; and a difference between an average value of brightness values of the bright regions and the average value of the brightness values of the dark regions is greater than a preset difference.

Further, after the determining whether the to-be-checked image is a backlight scenario according to the dark region and the bright region, the operations further include performing verification on the backlight scenario, where if an average gradient of a pixel included in the dark region in the to-be-checked image is greater than a preset gradient threshold, it is determined that the to-be-checked image is the backlight scenario; and if the average gradient of a pixel included in the dark region in the to-be-checked image is less than the preset gradient threshold, it is determined that the to-be-checked image is a non-backlight scenario.

The backlight detection device according to this embodiment may be used to execute the technical solutions of the foregoing method embodiment, and implementation principles and technical effects of the backlight detection device are similar to those of the foregoing method embodiment, which are not described herein again.

In the several embodiments provided in the present application, it should be understood that the disclosed device and method may be implemented in other manners. For example, the described device embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A backlight detection method performed by a device with a camera, comprising:
acquiring a brightness value of each image block in a to-be-checked image;
determining a brightness relationship between the adjacent image blocks according to the brightness value of each image block;
determining a dark region and a bright region in the to-be-checked image according to the brightness relationship between the adjacent image blocks; and
determining whether the to-be-checked image is a backlight scenario according to the dark region and the bright region,
wherein the to-be-checked image comprises M rows and N columns of image blocks,
wherein both M and N are positive integers,
wherein determining the brightness relationship between the adjacent image blocks according to the brightness value of each image block comprises determining the brightness relationship between any two adjacent image blocks in each row or each column of the to-be-checked image according to a magnitude relationship between a brightness value difference and a first preset brightness threshold,
wherein the brightness value difference is a difference between the any two adjacent image blocks in each row or each column of the to-be-checked image, and
wherein determining the dark region and the bright region in the to-be-checked image according to the brightness relationship between the adjacent image blocks comprises:

determining that the image block with a smaller brightness value is the dark region when the brightness of one image block of the any two adjacent image blocks is less than the brightness of the other image block of the any two adjacent image blocks and the brightness value of the image block with the smaller brightness value is less than a second preset brightness threshold;

determining that the image block with the smaller brightness value is a bright-dark transition region when the brightness of one image block of the any two adjacent image blocks is less than the brightness of the other image block and the brightness value of the image block with the smaller brightness value is greater than or equal to the second preset brightness threshold;

determining that the image block with a larger brightness value is the bright region when the brightness of one image block of the any two adjacent image blocks is greater than the brightness of the other image block of the any two adjacent image blocks and the brightness value of the image block with a larger brightness value is greater than a third preset brightness threshold; and determining that the image block with the larger brightness value is the bright-dark transition region when the brightness of one image block of the any two adjacent image blocks is greater than the brightness of the other image block of the any two adjacent image blocks and the brightness value of the image block with the larger brightness value is less than or equal to the third preset brightness value.

2. The method according to claim 1, wherein determining the brightness relationship between any two adjacent image blocks according to the magnitude relationship between the brightness value difference and the first preset brightness threshold, wherein the brightness value difference is the difference between the any two adjacent image blocks, comprises:

determining that brightness of one image block of the any two adjacent image blocks is greater than brightness of the other image block of the any two adjacent image blocks when the brightness value difference between the any two adjacent image blocks is greater than the first preset brightness threshold; and determining that the any two adjacent image blocks have the same brightness when an absolute value of the brightness value difference between the any two adjacent image blocks is less than or equal to the first preset brightness threshold.

3. The method according to claim 2, wherein the first preset brightness threshold is an average value of all absolute values of the brightness value differences between the any two adjacent image blocks in the to-be-checked image.

4. The method according to claim 1, wherein the brightness value difference is the difference between the any two adjacent image blocks in each row of the to-be-checked image, wherein before determining the brightness relationship between the any two adjacent image blocks in each row of the to-be-checked image according to the magnitude relationship between the brightness value difference and the first preset brightness threshold, method further comprises:

acquiring the brightness value difference between the any two adjacent image blocks in each row in a sequence from a first image block to a last image block in each row of the to-be-checked image, or acquiring the brightness value difference between the any two adjacent image blocks in each row in a sequence from a last image block to a first image block in each row of the to-be-checked image, wherein before determining the brightness relationship between the any two adjacent image blocks in each column of the to-be-checked image according to the magnitude relationship between the brightness value difference and the first preset brightness threshold, and wherein the brightness value difference is the difference between the any two adjacent image blocks in each column of the to-be-checked image, the method further comprises acquiring the brightness value difference between the any two adjacent image blocks in each column in the sequence from a first image block to a last image block in each column of the to-be-checked image, or acquiring the brightness value difference between the any two adjacent image blocks in each column in the sequence from a last image block to a first image block in each column of the to-be-checked image.

5. The method according to claim 4, wherein determining the dark region and the bright region in the to-be-checked image according to the brightness relationship between the adjacent image blocks further comprises:

determining, for any image block in each row or each column, the image block as the bright region or the dark region when the image block is the bright region or the dark region in both the sequence from the first image block to the last image block in each row or each column and the sequence from the last image block to the first image block in each row or each column;

determining, for any image block in each row or each column, the image block as the bright-dark transition region when the image block is the bright region in one sequence and is the dark region in another sequence, wherein the one sequence and the another sequence are the sequence from the first image block to the last image block in each row or each column and the sequence from the last age block to the first image block in each row or each column; and determining, for any image block in each row or each column, the image block as the dark region or the bright region when the image block is the dark region or the bright region in one sequence and is the bright-dark transition region in another sequence, wherein the one sequence and the another sequence are the sequence from the first image block to the last image block in each row or each column and the sequence from the last image block to the first image block in each row or each column.

6. The method according to claim 4, wherein determining whether the to-be-checked image is the backlight scenario according to the dark region and the bright region comprises, determining that the to-be-checked image is the backlight scenario when the dark region and the bright region in the to-be-checked image meet a preset bright-dark relationship, wherein the preset bright-dark relationship meets any one condition of or a combination of multiple conditions of the following conditions:

a ratio of a total area of the dark region to an area of the to-be-checked image is greater than a preset ratio;

an average value of brightness values of the dark regions is less than a preset average value; and a difference between the average value of brightness values of the bright regions and the average value of the brightness values of the dark regions is greater than a preset difference.

7. The method according to claim 6, wherein after determining whether the to-be-checked image is the backlight scenario according to the dark region and the bright region, the method further comprises performing verification on the backlight scenario, wherein when an average gradient of a pixel that is part of the dark region in the to-be-checked image is greater than a preset gradient threshold, the to-be-checked image is the backlight scenario, and wherein when the average gradient of the pixel that is part of the dark region in the to-be-checked image is less than the preset gradient threshold, the to-be-checked image is a non-backlight scenario.

8. The method according to claim 1, wherein determining the brightness relationship between the adjacent image blocks according to the brightness value of each image block comprises determining a brightness relationship between any two adjacent image blocks in each column of the to-be-checked image according to a magnitude relationship between a brightness value difference and a first preset brightness threshold, wherein the brightness value difference is a difference between the any two adjacent image blocks in each column of the to-be-checked image.

9. A backlight detection device comprising:
a processor; and
a memory comprising instructions that, when executed by the processor, cause the processor to perform operations comprising:
acquiring a brightness value of each image block in a to-be-checked image, wherein the to-be-checked image comprises M rows and N columns of image blocks wherein both M and N are positive integers;
determining a brightness relationship between the adjacent image blocks according to the brightness value of each image block;
determining a dark region and a bright region in the to-be-checked image according to the brightness relationship between the adjacent image blocks; and
determining whether the to-be-checked image is a backlight scenario according to the dark region and the bright region,
wherein determining the brightness relationship between the adjacent image blocks according to the brightness value of each image block comprises determining the brightness relationship between any two adjacent image blocks in each row or each column of the to-be-checked image according to a magnitude relationship between a brightness value difference and a first preset brightness threshold,
wherein the brightness value difference is a difference between the any two adjacent image blocks in each row or each column of the to-be-checked image, and
wherein determining the dark region and the bright region in the to-be-checked image according to the brightness relationship between the adjacent image blocks comprises:
determining that the image block with a smaller brightness value is the dark region when the brightness of one image block of the any two adjacent image blocks is less than the brightness of the other image block of the any two adjacent image blocks and the brightness value of the image block with the smaller brightness value is less than a second preset brightness threshold;
determining that the image block with the smaller brightness value is a bright-dark transition region when the brightness of one image block of the any two adjacent image blocks is less than the brightness of the other image block of the any two adjacent image blocks and the brightness value of the image block with the smaller brightness value is greater than or equal to the second preset brightness threshold;
determining that the image block with the larger brightness value is the bright region when the brightness of one image block of the any two adjacent image blocks is water than the brightness of the other image block of the any two adjacent image blocks and the brightness value of the image block with a larger brightness value is greater than a third preset brightness threshold; and
determining that the image block with the larger brightness value is the bright-dark transition region when the brightness of one image block of the any two adjacent image blocks is greater than the brightness of the other image block of the any two adjacent image blocks and the brightness value of the image block with the larger brightness value is less than or equal to the third preset brightness value.

10. The device according to claim 9, wherein the operations comprising determining the brightness relationship between the any two adjacent image blocks according to the magnitude relationship between the brightness value difference and the first preset brightness threshold, wherein the brightness value difference is the difference between the any two adjacent image blocks, further comprise:
determining that brightness of one image block of the any two adjacent image blocks is greater than brightness of the other image block when the brightness value difference between the any two adjacent image blocks is greater than the first preset brightness threshold, and
determining that the any two adjacent image blocks have the same brightness when an absolute value of the brightness value difference between the any two adjacent image blocks is less than or equal to the first preset brightness threshold.

11. The device according to claim 10, wherein the first preset brightness threshold is an average value of all absolute values of the brightness value differences between the any two adjacent image blocks in the to-be-checked image.

12. The device according to claim 9, wherein the brightness value difference is a difference between the any two adjacent image blocks in each row of the to-be-checked image, and wherein operations further comprise:
before determining the brightness relationship between the any two adjacent image blocks in each row of the to-be-checked image according to the magnitude relationship between the brightness value difference and the first preset brightness threshold, acquiring the brightness value difference between the any two adjacent image blocks in each row in a sequence from a first image block to a last image block in each row of the to-be-checked image, and acquiring the brightness value difference between the any two adjacent image blocks in each column in a sequence from a first image block to a last image block in each column of the to-be-checked image; or
acquiring the brightness value difference between the any two adjacent image blocks in each row in the sequence from a last image block to a first image block in each row of the to-be-checked image, and acquiring the brightness value difference between the any two adjacent image blocks in each column in a sequence from a first image block to a last image block in each column of the to-be-checked image.

13. The device according to claim 12, wherein the operations comprising determining the dark region and the bright region in the to-be-checked image according to the brightness relationship between the adjacent image blocks further comprise:
- determining, for any image block in each row or each column, the image block as the bright region or the dark region when the image block is the bright region or the dark region in both the sequence from the first image block to the last image block in each row or each column and the sequence from the last image block to the first image block in each row or each column;
- determining, for any image block in each row or each column, the image block as the bright-dark transition region when the image block is the bright region in one sequence and is the dark region in another sequence, wherein the one sequence and the another sequence are the sequence from the first image block to the last image block in each row or each column and the sequence from the last image block to the first image block in each row or each column; and
- determining, for any image block in each row or each column, the image block as the dark region or the bright region when the image block is the dark region or the bright region in one sequence and is the bright-dark transition region in another sequence, wherein the one sequence and the another sequence are the sequence from the first image block to the last image block in each row or each column and the sequence from the last image block to the first image block in each row or each column.

14. The device according to claim 12, wherein the operations comprising determining whether the to-be-checked image is the backlight scenario according to the dark region and the bright region further comprise determining that the to-be-checked image is the backlight scenario when the dark region and the bright region in the to-be-checked image meet a preset bright-dark relationship, and wherein the preset bright-dark relationship meets any one condition of or a combination of multiple conditions of the following conditions:
- a ratio of a total area of the dark region to an area of the to-be-checked image is greater than a preset ratio;
- an average value of brightness values of the dark regions is less than a preset average value; and
- a difference between an average value of brightness values of the bright regions and the average value of the brightness values of the dark regions is greater than a preset difference.

15. The device according to claim 14, wherein the operations further comprises performing verification on the backlight scenario, wherein when an average gradient of a pixel that is part of the dark region in the to-be-checked image is greater than a preset gradient threshold, the to-be-checked image is the backlight scenario, and wherein when the average gradient of the pixel that is part of the dark region in the to-be-checked image is less than the preset gradient threshold, the to-be-checked image is a non-backlight scenario.

16. The device according to claim 9, wherein the to-be-checked image comprises M rows and N columns of image blocks, wherein both M and N are positive integers, and wherein operations comprising determining the brightness relationship between the adjacent image blocks according to the brightness value of each image block further comprise determining a brightness relationship between any two adjacent image blocks in each column of the to-be-checked image according to a magnitude relationship between a brightness value difference and a first preset brightness threshold, wherein the brightness value difference is a difference between the any two adjacent image blocks in each column of the to-be-checked image.

* * * * *